Oct. 20, 1942.  J. A. PARKS, JR., ET AL  2,299,650
ROTARY CUTTING AND SCORING MECHANISM
Filed April 23, 1940  4 Sheets-Sheet 1

FIG. I

INVENTORS
JOSEPH A. PARKS, JR.
BY JAMES WM. BATCHELDER

ATTORNEY

INVENTORS
JOSEPH A. PARKS, JR.
JAMES W<sup>M</sup>. BATCHELDER
BY
ATTORNEY

INVENTORS
JOSEPH A. PARKS, JR.
JAMES W<sup>M</sup> BATCHELDER
ATTORNEY

Patented Oct. 20, 1942

2,299,650

UNITED STATES PATENT OFFICE 2,299,650

ROTARY CUTTING AND SCORING MECHANISM

Joseph A. Parks, Jr., Paterson, N. J., and James W. Batchelder, Titusville, Pa., assignors by mesne assignments, to Interchemical Corporation, New York, N. Y., a corporation of Ohio Application April 23, 1940, Serial No. 331,109

16 Claims. (Cl. 164—68)

This invention relates to the art of cutting and scoring continuously moving webs of paper, paper board, laminated paper products and similar materials, and aims to provide an improved apparatus for this purpose.

The cutting of continuously moving paper board is an important and difficult operation in the production of boxes, cartons and various other paper products. There are two general types of cutting and scoring apparatus in use at the present time for cutting and scoring continuously moving webs of paper board. The first of these uses cutting members having a vertical reciprocating movement. With this type of apparatus the cutting mechanism should be moved in synchronism with the longitudinal movement of the web so that the cut may be properly made in register with any printed matter or other indicia previously applied; and the waste stock should be removed so that the completed blank may be suitably delivered. While it is possible to attain both of these ends, the operation cannot conveniently and efficiently be carried out at speeds corresponding to those attained by other equipment used in the manufacture of paper products, such as the high speed printing presses that are now available. Furthermore, it is necessary to make frequent replacements in cutting blades and these obviously result in delays in production.

The second type of apparatus in use for this purpose is that in which the cutting member rotates at a speed corresponding with the speed of movement of the web and cooperates with either a stationary shearing edge or member or a rotating impression cylinder. While the principles of rotary cutters, particularly those using a rotating impression cylinder, lend themselves well to higher speeds of operation, cutters of this character that are now available have many inherent faults that prevent their economical use in industry. For example, unless the parts of the apparatus are accurately machined and adjusted and maintained in proper relationship, the cutting will not take place in proper register with any prior operations on the paper board, and the cutting may otherwise be inaccurate or incomplete. Moreover, the usual contact of the cutting blades with the impression cylinder and the resulting wear necessitates frequent replacement of the cutting blades and, in addition, frequently causes the apparatus to get out of adjustment. Since higher speed may be obtained with a rotary cutter than with a cutter of the reciprocating type, such adjustments and replacements are usually even more frequent than in cutters of the latter type.

When a rotating impression cylinder is employed, problems are also encountered in producing the required pressure during the cutting operation. In addition, the high speed and type of cutting employed in the rotary cutters now in use produces great quantities of paper dust which is troublesome to handle. In short, while the work produced by such rotary cutters may be regarded as satisfactory, the machines themselves are a constant source of trouble and expense.

It is the principal object of the present invention to provide an improved cutter of the type employing a rotating cutting cylinder and a cooperating rotating impression cylinder, which cutter is subject to none of the disadvantages mentioned above and is particularly adapted for practicing the improved method of cutting wherein the cutting blade is not brought into contact with the impression surface during the cutting operation. This method of cutting and a cutting blade particularly suited for this purpose are disclosed in the copending application of J. W. Batchelder, Serial No. 331,108, filed concurrently herewith.

A preferred form of apparatus that we have devised and perfected for attaining this general object, may comprise rigid spaced side frames having an upper cutting cylinder and a lower cooperating impression cylinder journalled in suitable bearings mounted in said frames. Gears may be provided on the cylinder shafts so that said cylinders may be rotated in synchronism and at the same speed. The cutting cylinder is provided with cutting portions and bearer portions which cooperate respectively with corresponding impression surfaces and bearer surfaces provided on the impression cylinder. It is the purpose of the bearer surfaces on the two cylinders to maintain the cutting blades in proper cooperative relation with respect to the impression surfaces which are so arranged with respect to one another that the cutting blades do not contact the impression surfaces during the cutting operation. The bearings for the cutting cylinder are rigidly mounted within the side frames while the bearings for the impression cylinder are preferably horizontally slidable within suitable openings provided in the side frames. With such a construction we have found that, by arranging the impression cylinder at a slight angle with respect to the cutting cylinder rather than vertically beneath said cylinder, the pressures required for effective cutting and scoring may be obtained by means of simple toggles which may be housed within the side frames; and the construction may be such that the pressure can be readily released if and when necessary.

The above and other features and objects of the invention will become apparent upon consideration of the following detailed description and the accompanying drawings in which.

Figure 1:
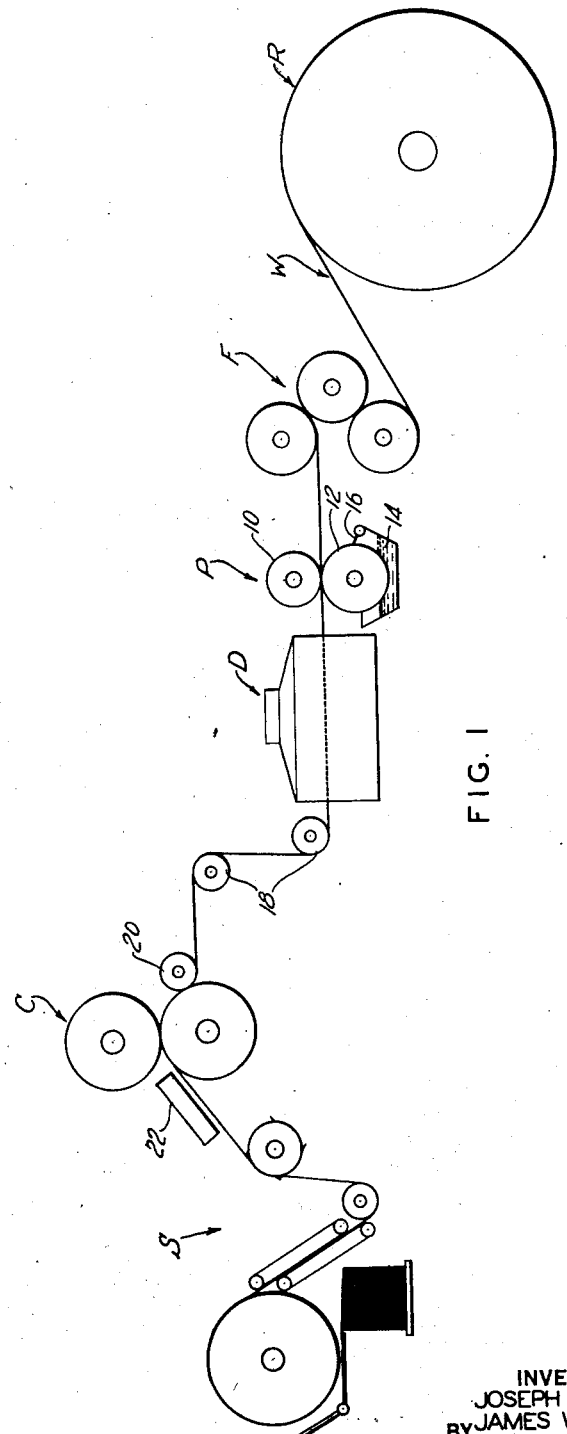
Fig. 1 is a diagrammatic side elevational view showing an apparatus embodying our invention as it may be used in conjunction with a high speed gravure printing press for the production of decorated carton blanks.

Referring now to the drawings, and particularly to Fig. 1, it will be observed that a web of paper board W is fed from a supply roll R by means of a suitable three roll feed unit F to a printing unit P where any desired decorations or indicia may be applied to one or both surfaces thereof, said printing unit being operated in synchronism with the feed unit F in any conventional manner. The printing unit shown in the present instance is a single color gravure printing press including an impression cylinder 10 and a printing cylinder 12 rotating within a suitable fountain or ink housing 14 and having a conventional doctor blade 16 for removing the excess ink and conditioning the printing cylinder for the proper application of ink to the web W. The ink applied in the printing unit P may be dried by passing the web through a suitable drier D, and the web is then passed over breaker rollers 18 and a guide roller 20 to a cutting and scoring apparatus C which is adapted to cut and score the web into blanks of the desired configuration. From the cutter C, the web is led to a stripping and delivery mechanism S where the waste is removed and the blanks finally separated and delivered. Although the cutter C is of such a character as to produce a minimum of paper dust, a suction dust remover 22 may be mounted adjacent the cutter C, if desired.

Figure 2:
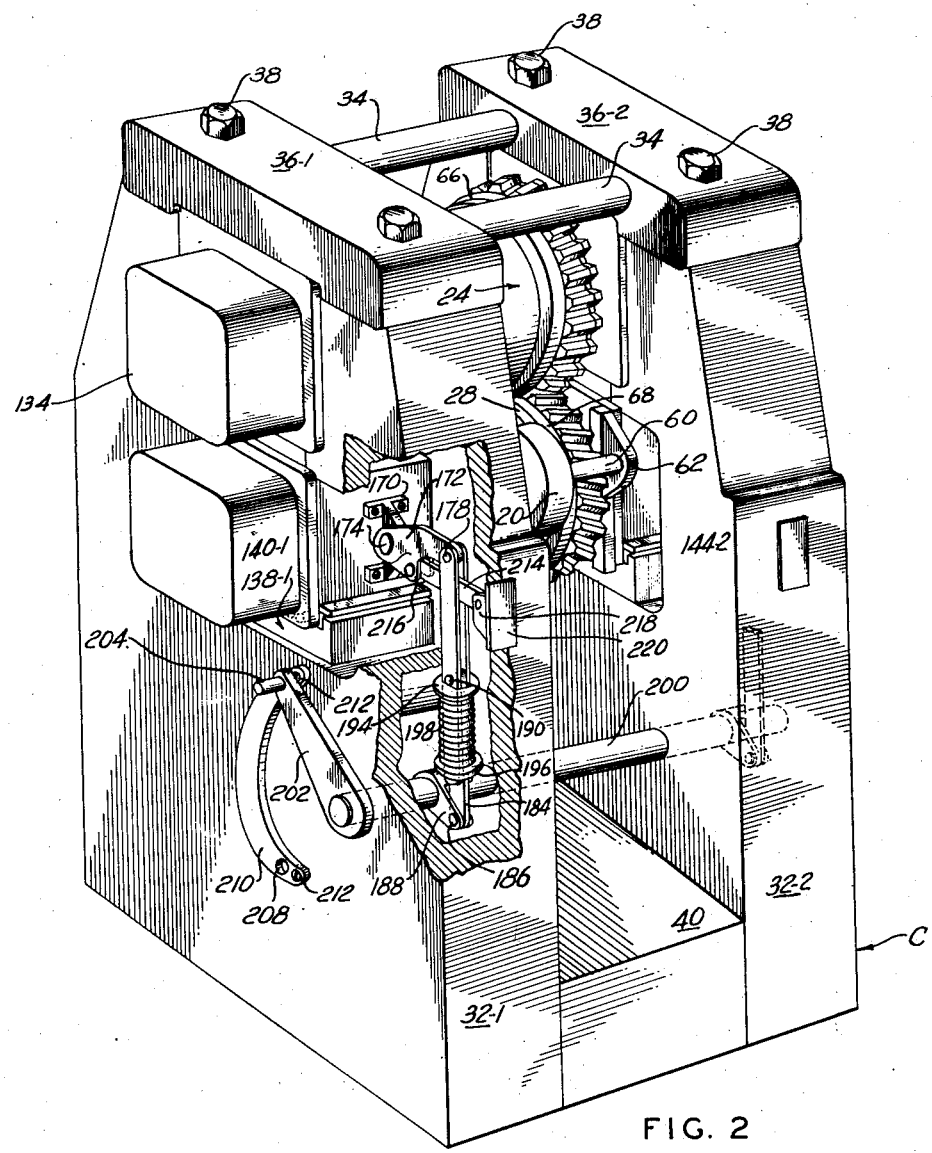
Fig. 2 is a perspective view, with certain portions broken away and in section, of a cutting apparatus embodying our invention.
Figure 3:
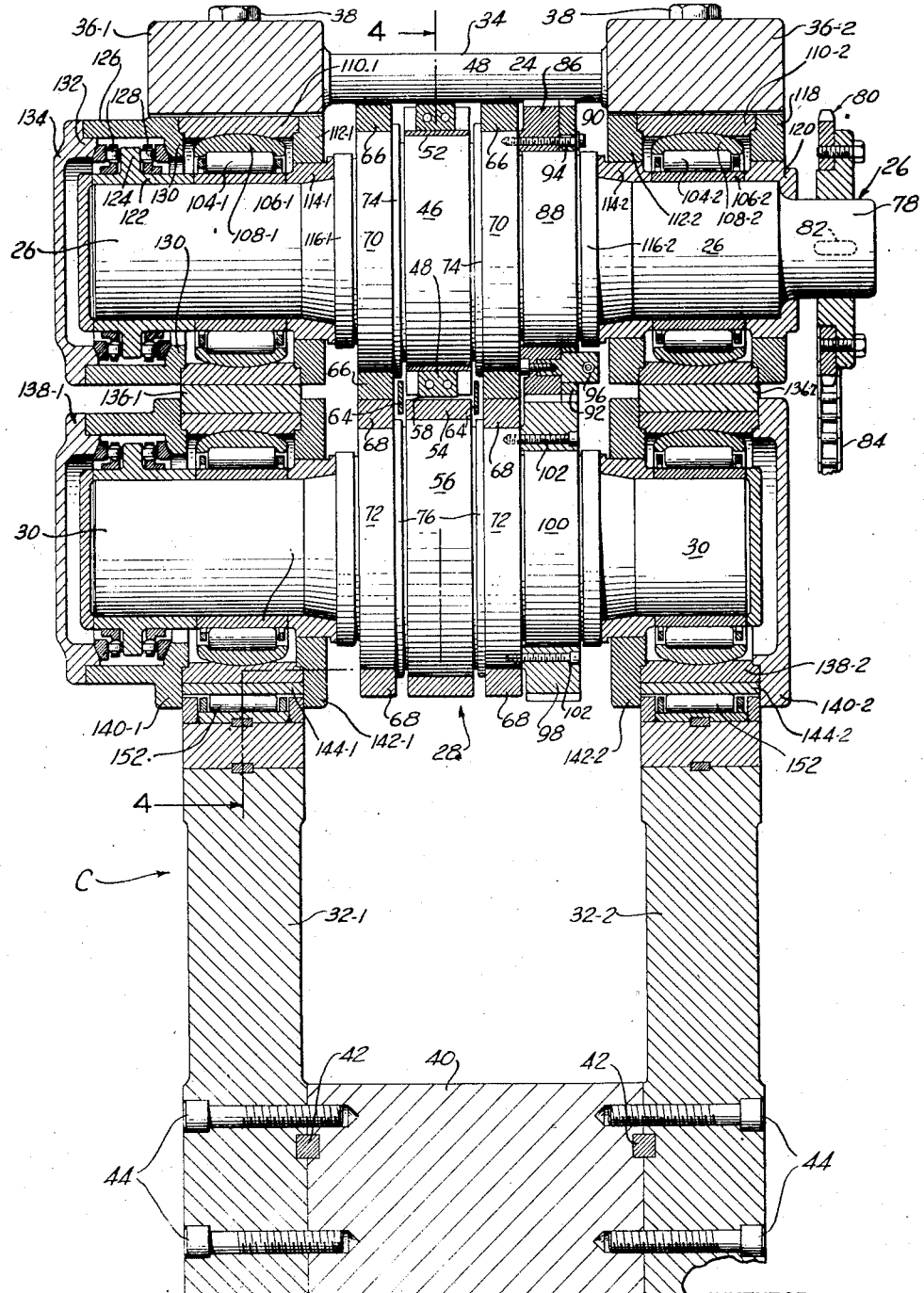
Fig. 3 is a transverse sectional view, taken substantially along the line of pressure between the cutting and impression cylinders and vertically through the side frames, as indicated by the line 3—3 in Fig. 4.

As best shown in Figs. 2 and 3, the rotary cutting apparatus C comprises an upper cutting cylinder 24 having a shaft 26 and cooperating with a lower impression cylinder 28 having a shaft 30, both of said shafts 26 and 30 being rotatably mounted in suitable bearings provided in left and right hand side frames 32—1 and 32—2, respectively, as will be more fully described hereinafter. Side frames 32—1, 32—2 are maintained spaced apart any desired distance, depending in the main upon the width of the material to be cut, by means of upper supporting rods 34 connected to top frame plates 36—1 and 36—2 secured in turn to their associated side frames by means of suitable bolts 38, and a lower base or spacing block 40 which is locked with keys 42 to the side frames 32—1 and 32—2, and secured thereto in any convenient manner, such as by means of screws or bolts 44.

Cutting cylinder 24 comprises an enlarged and substantially centrally disposed cutting section 46 having a plurality of cutting and/or scoring members or blades 48 secured to the periphery thereof by means of screws 50 (Fig. 4) and suitably spaced radially of the cylindrical cutting portion by means of spacing plates or rings 52. The cutting blades or scoring blades themselves may be of any suitable type adapted to function in accordance with the improved method of cutting disclosed in the concurrently filed copending application referred to above. Rule type blades having hardened cutting edges or cutting blades formed integrally with their associated supporting blocks have been found to be entirely satisfactory. These cutting blades cooperate with, but are maintained spaced from, a suitable hard impression surface 54 provided on an enlarged and substantially centrally disposed impression portion 56 of the impression cylinder 28. In Fig. 3, where one of the cutting blades 48 is shown in cutting position, it will be noted that there is a slight clearance or space 58 between the cutting edge of the blade 48 and the surface or periphery of the impression member or surface 54. This clearance or space 58 (which is greatly exaggerated in Fig. 3 for the sake of clarity) may be from about 0.0005 to 0.0010 inch for most thicknesses of the paper board being cut, and entirely eliminates any wear in the cutting edge of the blade caused by contact thereof with the impression surface 54. As the web W is fed to the impression surface preparatory to cutting and is guided around the roller 20, which roller may be mounted on a shaft 60 supported in suitable brackets 62 attached to the bearing blocks in the side frames 32—1 and 32—2, it may be guided to proper cutting position by means of suitable side guides 64. Roller 20 may, if desired, be adjustably and eccentrically mounted so that its pressure against the impression surface can be varied. The side guides 64 may be maintained and supported in proper position in any convenient manner.

In order to maintain the desired clearance 58 between the cutting blade 48 and the impression surface 54 while the cutting and impression cylinders are rotating at relatively high speeds, impression cylinder 24 is preferably provided with spaced cylindrical bearing portions or members 66, there being one such portion 66 on each side of the cutting portion 46, and these bearing members cooperate with and bear against correspondingly spaced and aligned bearing portions or members 68 provided on the impression cylinder 28. While the bearing members 66 and 68 may be formed integrally with the respective cylinders, we prefer to construct them as detachable rings of hardened metal attached to enlarged portions 70 and 72, respectively, and maintained spaced from the cutting and impression portions 46 and 56 by means of suitable flanges 74 and 76, respectively, formed on the cutting and impression cylinders shafts.

Cutting and impression cylinders 24 and 28 are driven at a suitable speed correlated with the speed of movement of the web W in any convenient manner. This is accomplished in the present embodiment of our invention by driving the shaft 26 of the cutting cylinder directly from any desired source of power. For this purpose, the right hand end of the shaft 26 is provided with a reduced portion 78 and a sprocket 80 is attached thereto by means of a key 82 and rotated at the desired speed by means of a cooperating chain 84. In order that the impression cylinder 28 may be rotated synchronously and in unison therewith, cutting cylinder 26 is provided with a gear 86 mounted on an enlarged portion 88 of the shaft 26 and secured to the bearing support 70 by means of screws 90. The outer face of the gear 86 adjacent the side frame 32—2 includes a back-lash prevention section 92 which is connected to the main section of the gear 86 through slots 94 registering with the screws 90, and a spring adjusting device 96 for maintaining and adjusting a proper resistance between the two sections of the gear for taking up back-lash. Gear 86, which may be of the helical spur type, meshes with a similar one section gear 98 provided on an enlarged portion 100 of the impression cylinder shaft 30 and connected to the bearer portion 72 by means of screws 102. Thus, as the cutting cylinder 24 is rotated in synchronism with the movement of the web W, the impression cylinder 28 will be rotated in unison therewith.

It will be understood that in a cutter of the rotary type herein described, it is essential that the cutting and impression cylinders 24 and 28 be maintained in accurate position and rotated with the utmost precision during the cutting and scoring operation if register with any preceding operations on the web is to be maintained and such operations are to be carried out at relatively high rates of speed. Consequently, it is necessary and desirable to provide sturdy and efficient bearings for the shafts 26 and 30. In Fig. 3, it will be noted that shaft 26 is rotatably mounted in suitable elongated roller bearings 104—1 and 104—2, the ring bushings 106—1 and 106—2 of which are secured to the shaft 26. The outer race 108—1 and 108—2 of each roller bearing is mounted in a housing 110—1 and 110—2, respectively, which is closed at the inside of the side frame adjacent the cutting cylinder by means of closing plates 112—1 and 112—2 fitted upon bushings 114—1 and 114—2 mounted on the shaft 26 and separated from the other elements of the cutting cylinder by means of enlarged flanges or sections 116—1 and 116—2 formed on the shaft 26. The outside of the right hand bearing housing for the shaft 26 is closed by means of an outer cover member 118 fitted upon a bushing 120 which is mounted upon the shaft 26 and through which the reduced portion 78 of said shaft extends. However, the left hand end of the shaft 26 and the associated left hand bearing housing are somewhat different in construction in that a flanged bushing 122 having a flange 124 is mounted adjacent the roller bearing bushing 106—1 and an outwardly extending housing portion 126 is fitted upon the outside of the housing 110—1. Suitable thrust bearings 128 are provided on each side of the flange 124 of the bushing 122 and maintained in proper position between an inner supporting surface 130 provided on the housing portion 126 and an inwardly projecting edge 132 of an outer cover member 134. The space between the housing and the various bearings allows for proper lubrication thereof.

The housing members 110—1 and 110—2 are supported upon suitable supporting plates 136—1 and 136—2 which in turn are mounted upon housing members 138—1 and 138—2, respectively, for the various bearings associated with the shaft 30 of the impression cylinder 28. The bearings and housing for the shaft 30, shown in the present instance, are identical with those described above for the shaft 26 except, however, for the provision of projecting flanges 140—1, 142—1 and 140—2 and 142—2. Supporting plates 136—1 and 136—2 are fitted between the upper edges of these flanges and suitable supporting slide plates 144—1 and 144—2, respectively, are fitted between the lower edges of these flanges.

Figure 4:
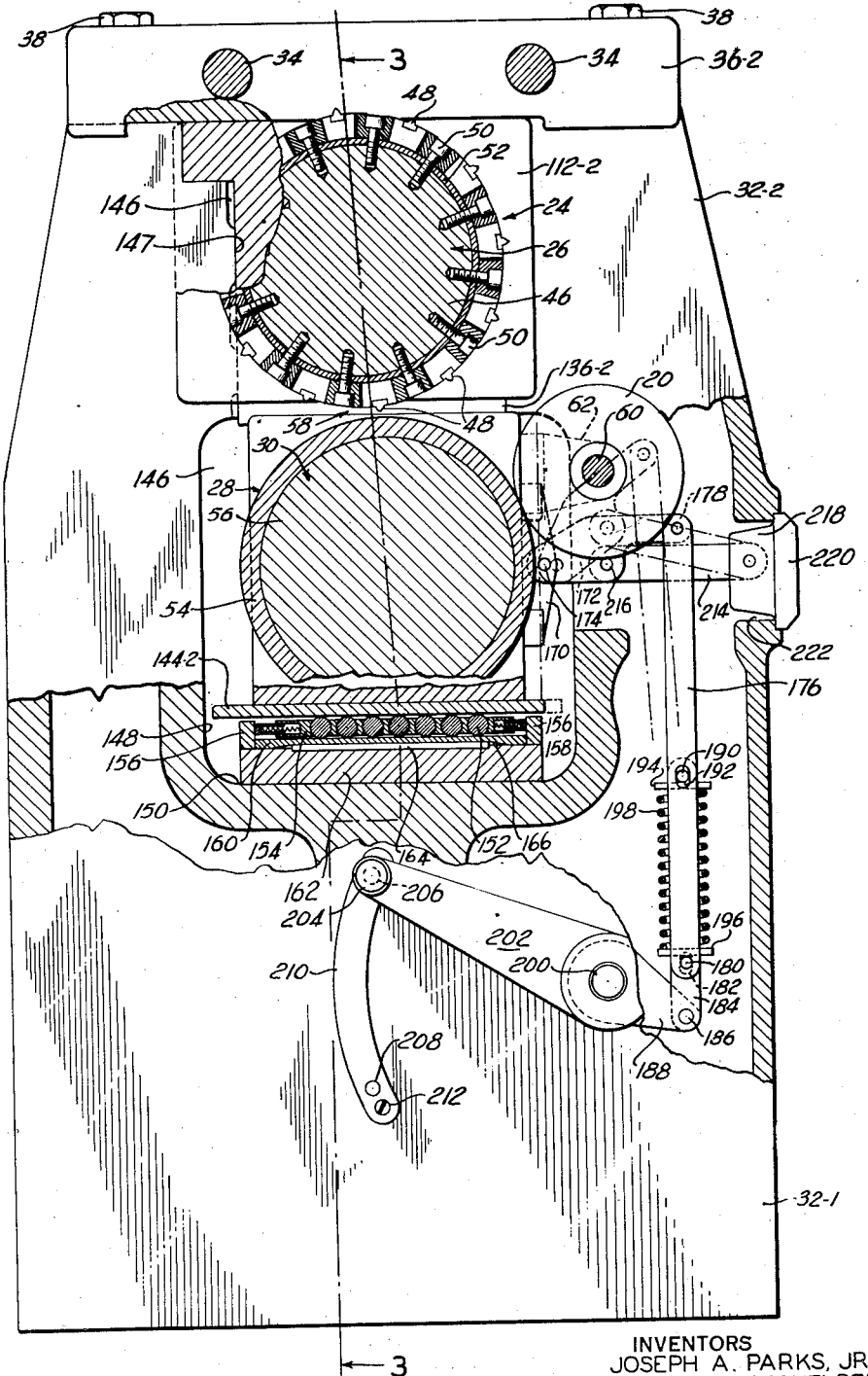
Fig. 4 is a transverse vertical sectional view taken substantially along the line 4—4 of Fig. 3.

All of the bearings and bearing housings for the shafts 26 and 30 and the supporting plates associated therewith are mounted or disposed in a suitable U-shaped opening 146 provided in the side frames 32—1 and 32—2 and closed the top thereof by means of the top frame plates 36—1 and 36—2. As indicated in Fig. 4, the sides of the upper portion of the U-shaped opening, have finished faces 147 which are arranged so that they are substantially flush with the sides of the housings 110—1 and 110—2 for the cutting cylinder shaft bearings so that any lateral displacement of the shaft 26 and the associated bearings is prevented. However, the portion of the U-shaped opening below the bearing housing 110 includes side walls 148, spaced farther apart than the finished wall portions 147 adjacent the shaft 26, and a bottom wall 150 which forms the base of the U-shaped opening, the distance between the two walls 148 being sufficient to allow a somewhat limited movement of the associated bearing housing for the shaft 30. The supporting plate 144 for each of the impression cylinder bearing housings rests upon a plurality of roller bearings 152 held in proper place by a suitable carrier member 154. Carrier member 154 is resiliently held between end plates 156 by means of spring pressed plungers 158, said end plates being secured to a base or rider plate 160 upon which the rollers 152 rest. The entire roller bearing assembly is held in proper position on a spacer or supporting plate 162 by means of a key plate 164 mounted in a suitable indentation 166 provided in the bottom side of the rider plate 160. Each spacer plate 162 rests upon the base 150 of the associated U-shaped opening and is of such thickness that the entire impression cylinder shaft and assembly is maintained in proper vertical position within the side frames. It will be apparent that with this roller bearing supporting structure for the impression cylinder bearing housings, said housings and the entire impression cylinder assembly may be moved horizontally back and forth within the opening defined by the side walls 148 of the U-shaped opening provided in the associated side frame. In this manner the bearer and impression surfaces of the impression cylinder may be moved into and out of operative relationship with the associated bearer surfaces and cutting members provided on the cutting cylinder.

For maintaining the impression and cutting cylinders in proper operative position with the respective bearing surfaces of the two cylinders in proper pressure contact, we have provided a special toggle mechanism which is adapted to produce the desired operating pressure between the bearer surfaces of the cutting and impression cylinders. This mechanism also allows a prompt release of the operating pressure and will now be described.

As shown in Figs. 2 and 4, one side of each of the bearing housings for the impression cylinder shaft 30 is provided with a bracket 170 which is secured thereto in any suitable manner. A link 172 is pivoted at 174 to the bracket 170 and extends inwardly through a suitable opening into the inside of the associated side frame which, for this purpose, and also to render the entire construction lighter in weight, is made hollow at least in the forward portion thereof shown in Fig. 2. Link 172 is angular in shape and the opposite end thereof has a double faced link 176 pivoted thereto at 178 and extending downwardly within the associated side frame. A pin 180 connects the lower ends of the double faced link 176 and rides in a slot 182 provided in the central portion of an interconnecting link 184. Link 184 is pivoted at 186 to a lever arm 188 and the opposite end thereof extends upwardly between the faces of the link 176 and is provided with a pin 190 therein which is adapted to ride in suitably arranged slots 192 provided in the central portion of the double faced link 176. By providing a presser plate or collar 194 beneath the pin 190 and a similar presser plate or collar 196 above the pin 180 and mounting a comparatively heavy contractile spring 198 between said presser plates, the linkage between the pivot 178 on link 172 and the pivot 186 on arm 188 is rendered resilient to the limited extent allowed by the slots 182 and 192. Lever arm 188 is mounted upon a shaft 200 which extends through and is journalled in the side frames 32—1 and 32—2. Outside of the side frame 32—1, said shaft 200 is provided with a crank arm 202 having a spring pressed plunger handle 204, the plunger of which is adapted to register either with an upper opening 206 or a lower opening 208 provided in a suitable arcuate shaped track 210 attached to the outside of the side frame 32—1 by means of screws 212.

To render any movement of the crank arm 202 effective for operating the toggle mechanism composed of the linkage described above, a stop link 214 is provided adjacent the link 172. This link 214 is connected or pivoted at its inner end to a suitable downwardly extending lug 216 provided on the link 172 and at its other end is pivotally connected to a bracket or lug 218 attached to or formed integral with a stop plate 220. Stop plate 220 is arranged to bear against the outside edge of the associated side frame and the bracket 218 associated therewith extends through a suitable opening 222 provided in said edge.

In Fig. 2, the toggle mechanism and the impression cylinder which it is adapted to actuate, are shown in operative position with the lever arm or crank arm 202 in its upper position, the handle 204 thereof registering with the opening 206. It will be apparent that by moving the crank arm 202 downwardly so that the handle thereof registers with the opening 208, lever arm 188 will move upwardly and force the linkage 184, 176 upwardly also. Due to the provision of the stop link 214 and its pivotal connection to the lug 216 of angular link 172, this movement will cause the impression cylinder bearing housing to move to the right as shown in Fig. 4 and out of operative relationship with the impression cylinder, and the entire toggle mechanism will assume the dotted line position there shown. By moving the crank arm upwardly so that the handle registers with opening 206, all of the parts will be moved back to the Fig. 4 positions.

When the cutting and impression cylinders are in their operative positions shown in Figs. 2 and 4, the construction is such that they are not vertically disposed one above the other. In the embodiment shown, the impression cylinder is offset to the right of the cutting cylinder (Fig. 4), so that the angle between a line passing through their centers and a vertical line is about 4°. Thus, by applying a horizontal force of about 1000 pounds to the axis of the impression cylinder, a pressure of about 15,000 pounds will be created between the contacting bearing surfaces of the impression and cutting cylinder. Furthermore, the toggle mechanism described above is such that a force of 1000 pounds will be developed against the impression cylinder by the application of a force of about 80 pounds to the lower end of the toggle linkage through the crank arm 202. It will therefore be apparent that the high pressures desired during operation of the cutter are easily obtained by the simple mechanism we have provided.

Various changes may be made in the construction and certain features may be employed without others without departing from our invention or sacrificing any of its advantages.

What we claim is:

1. Apparatus for cutting a traveling web of flexible material, comprising a cutting cylinder having a cutting blade and a bearer portion; and an impression cylinder having an impression surface and a bearer portion, the bearer portions of said cylinders engaging one another and being so constructed and arranged with reference to the cutting blade and impression surface that the blade does not contact the impression surface during operative rotation of the cylinders.

2. Apparatus for cutting a traveling web of flexible material, comprising a cutting cylinder having a cutting blade and a bearer portion on each side of said cutting blade; an impression cylinder having an impression surface and a bearer portion on each side of said impression surface, the bearer portions of said cutting cylinder engaging the bearer portions of said impression cylinder and being so constructed and arranged with reference to the cutting blade and impression surface that the blade does not contact the impression surface during operative rotation of said cylinders; and means for rotating said cylinders in synchronism.

3. Apparatus for cutting a traveling web of flexible material, comprising a cutting cylinder having a cutting blade and a bearer portion on each side of said cutting blade; an impression cylinder having an impression surface and a bearer portion on each side of said impression surface, the bearer portions of said cutting cylinder engaging the bearer portions of said impression cylinder and being so constructed and arranged with reference to the cutting blade and impression surface that the blade does not contact the impression surface during operative rotation of said cylinders; and means for producing a predetermined operating pressure between said engaging bearer portions during operative rotation of said cylinders.

4. Apparatus for operating on a traveling web, comprising spaced side frames, a cutting cylinder having a shaft journalled in said side frames and having a cutting blade mounted thereon, an impression cylinder having a shaft journalled in said side frames and having a hard and smooth impression surface arranged thereon in cooperative relation with respect to said cutting blade, and means for preventing contact between said cutting blade and said impression surface during operative rotation of said cylinders.

5. Apparatus for operating on a traveling web, comprising spaced side frames, a cutting cylinder having a shaft journalled in said side frames and having a cutting blade mounted thereon, an impression cylinder having a shaft journalled in said side frames and having a hard and smooth impression surface arranged thereon in cooperative relation with respect to said cutting blade, means for preventing contact between said cutting blade and said impression surface during operative rotation of said cylinders, and means mounted on said shafts adjacent one of the side frames for causing said cylinders to be rotated in synchronism.

6. Apparatus for operating on a traveling web, comprising spaced side frames having substantially U-shaped openings in the upper portions thereof; bearing means mounted in said frame openings; a cutting cylinder having a shaft journalled in said bearing means and having a cutting blade; an impression cylinder having a shaft journalled in said bearing means and having an impression surface arranged thereon in cooperative relation with respect to said cutting blade; means for maintaining a clearance between said cutting blade and impression surface during operative rotation of said cylinders; and means for moving the bearing means for said cylinder shafts so that said cylinders may be moved into and out of cooperative relation with respect to one another.

7. Apparatus for operating on a traveling web, comprising spaced side frames having substantially U-shaped openings in the upper portions thereof; lower bearing means slidably mounted in said frame openings; upper bearing means mounted in said frame openings, a cutting cylinder having a shaft journalled in one of said bearing means; a cooperating impression cylinder having a shaft journalled in the other of said bearing means; and means for moving said slidably mounted bearing means within said frame openings so that said cutting and impression cylinders may be moved into and out of cooperative relation with respect to one another.

8. Apparatus for operating on a traveling web, comprising spaced side frames having substantially U-shaped openings in the upper portions thereof; lower bearing means slidably mounted in said frame openings; upper bearing means mounted in said frame openings, a cutting cylinder having a shaft journalled in one of said bearing means; a cooperating impression cylinder having a shaft journalled in the other of said bearing means; gear means mounted on each of said shafts for rotating said cylinders in synchronism; and means for moving said slidably mounted bearing means within said frame openings so that said cutting and impression cylinders and said gear means may be moved into and out of cooperative relation with respect to one another.

9. Apparatus for operating on a traveling web, comprising spaced side frames having substantially U-shaped openings in the upper portions thereof; lower bearing means mounted for horizontal sliding movement in said frame openings; upper bearing means so mounted in said frame openings and upon said lower bearing means as to remain stationary during the sliding movements of said lower bearing means; a cutting cylinder having a shaft journalled in said upper bearing means; a cooperating impression cylinder having a shaft journalled in said lower bearing means; and means for moving said lower bearing means so as to move said impression cylinder into and out of operative position with respect to said cutting cylinder.

10. Apparatus for operating on a traveling web, comprising spaced side frames having substantially U-shaped openings in the upper portions thereof, lower bearing means mounted for horizontal sliding movement in said frame openings; upper bearing means so mounted in said frame openings and upon said lower bearing means as to remain stationary during the sliding movements of said lower bearing means; a cutting cylinder having a shaft journalled in said upper bearing means; a cooperating impression cylinder having a shaft journalled in said lower bearing means, said impression cylinder being angularly disposed beneath said cutting cylinder when in operative position so that a force horizontally applied to said lower bearing means will produce operative pressure between said cylinders; and means for moving said lower bearing means so as to move said impression cylinder into and out of operative position with respect to said cutting cylinder.

11. Apparatus for operating on a traveling web, comprising spaced side frames having substantially U-shaped openings in the upper portions thereof, lower bearing means mounted for horizontal sliding movement in said frame openings; upper bearing means so mounted in said frame openings and upon said lower bearing means as to remain stationary during the sliding movements of said lower bearing means; a cutting cylinder having a shaft journalled in said upper bearing means; a cooperating impression cylinder having a shaft journalled in said lower bearing means, said impression cylinder being angularly disposed beneath said cutting cylinder when in operative position so that a force horizontally applied to said lower bearing means will produce operative pressure between said cylinders; and toggle means for applying operative force to said lower bearing means.

12. Apparatus for operating on a traveling web, comprising spaced side frames having substantially U-shaped openings in the upper portions thereof, lower bearing means mounted for horizontal sliding movement in said frame openings; upper bearing means so mounted in said frame openings and upon said lower bearing means as to remain stationary during the sliding movements of said lower bearing means; a cutting cylinder having a shaft journalled in said upper bearing means; a cooperating impression cylinder having a shaft journalled in said lower bearing means, said impression cylinder being angularly disposed beneath said cutting cylinder when in operative position so that a force horizontally applied to said lower bearing means will produce operative pressure between said cylinders; and toggle means mounted at least partially within said side frames for applying operative force to said lower bearing means.

13. Apparatus for operating on a traveling web comprising spaced side frames; a cutting cylinder having a shaft journalled in said side frames; a cooperating impression cylinder having a shaft journalled in said side frames and angularly disposed beneath said cutting cylinder shaft when in operative position, said impression cylinder being movable substantially horizontally for applying operative pressure to said cutting cylinder; and means for moving said impression cylinder into and out of operative position.

14. Apparatus for operating on a traveling web, comprising a cutting cylinder, a cooperating impression cylinder angularly disposed beneath said cutting cylinder and adapted to be moved in a substantially horizontal plane for producing operative pressure between said cylinders, and means for moving said impression cylinder into and out of operative position.

15. Apparatus for cutting and scoring a traveling web of flexible material, comprising a first cylinder having cutting and scoring blades mounted thereon and having a bearer portion; and a second cylinder having an impression surface and a bearer portion, the bearer portions of said cylinders engaging one another and projecting radially beyond the associated cutting and scoring blades and impression surface so that the blades do not contact the impression surface during operative rotation of the cylinders.

16. Apparatus for cutting a traveling web of flexible material, comprising a cylindrical carrying member, a cutting blade adjustably mounted on said carrying member, and a cylindrical bearer member provided on said carrying member and spaced axially from said cutting blade, said bearer member projecting radially beyond said cutting blade.

JOSEPH A. PARKS, Jr.
JAMES W. BATCHELDER.